United States Patent Office 3,471,319
Patented Oct. 7, 1969

3,471,319
METHOD OF IMPARTING TO HYDROPHOBIC TEXTILE MATERIALS ANTISTATIC PROPERTIES
Reginald L. Wakeman, Philadelphia, Pa., assignor to Millmaster Onyx Corporation, New York, N.Y., a corporation of New York
No Drawing. Filed July 22, 1968, Ser. No. 746,293
Int. Cl. C08j *1/44;* C09k *3/16*
U.S. Cl. 117—139.5                     4 Claims

ABSTRACT OF THE DISCLOSURE

A process for treating hydrophobic textile materials to give them antistatic properties which comprises applying an antistatic agent to the textile materials while maintaining the pH of the agent on the acid side, and then curing the antistatic agent in situ, the antistatic agent being a water-soluble, linear polytertiary amine having at least one terminal tertiary amino group and the linear chain being interrupted by a plurality of tertiary amino groups.

---

This invention relates to an improved process for treating hydrophobic textile fibers, filaments, yarns, woven and non-woven fabrics, knitted goods and the like, to give such materials antistatic properties while significantly improving the whiteness thereof after being laundered.

It has heretofore been proposed to treat textile materials of the above type with the same type of water-soluble, linear polytertiary amines as those utilized herein and more fully described hereinafter. However, such prior treatment was made while maintaining the pH of the antistatic agent on the alkaline side. Such prior treatment has proved to be extremely effective and provides a very durable antistatic finish, but the "whiteness" of the treated material after laundering has not been as great as is sometimes desirable.

It has now been discovered that if the treatment is conducted while the pH of the treating agent is on the acid side, there is a significant improvement in such "whiteness" characteristic with only a small sacrifice of antistatic durability. Preferably, a catalyst such as zinc fluoborate is also used in a proportion of about 0.05 to 1.0% by weight of the antistatic composition.

Polymeric amino condensation products for application to hydrophobic textile materials are well known to the art and can be produced by reaction of an alkylating diester of a water-soluble polyalkylene glycol, specifically a polyethylene glycol dichloride, with a primary aliphatic amine containing from one to twenty-two carbon atoms, preferably one of low molecular weight such as methyl amine, ethyl amine or hydroxyethyl amine. Such antistatic finishes and methods of making the same are described in U.S. Patent 3,070,552 issued Dec. 25, 1962. Products of this nature which are used as starting materials in making the antistatic compounds used in the present invention have the following generic formula:

$$Q-Z-[N(R)-Z]_p-Q'$$

where R is an alkyl, alkenyl or hydroxyalkyl radical containing from one to twenty-two carbon atoms; Z is —CH$_2$CH$_2$(OCH$_2$CH$_2$)$_m$OR$_2$O(CH$_2$CH$_2$O)$_n$CH$_2$CH$_2$— in which R$_2$ is an organic divalent radical and $m$ and $n$ are average numbers between 3 and 40; $p$ is an integer having a value of at least 1; and Q and Q' are either secondary amino groups, —N(R)H, or covalently linked chlorine originating with the intermediate polyethylene glycol dichloride (or equivalent ester-forming residues of an inorganic acid or of an organically substituted sulfuric, phosphoric or sulfonic acid such as Br, I, SO$_3$CH$_3$, OSO$_3$H and the like).

Depending upon reaction conditions during the production of these polymeric amino condensation products, Q and Q' may be either the same or different end groups. Hence, the condensates may comprise any one, a combination of any two, or all three of the following species:

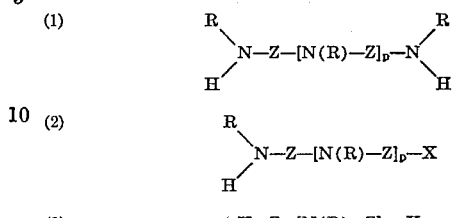

(3)         X—Z—[N(R)—Z]$_p$—X wherein R, Z and $p$ are as just defined and X is chlorine or an equivalent ester-forming residue of the intermediate alkylating polyalkylene glycol diester as set forth above. As hereinabove set forth, these structural components of the polymeric amino condensates are the starting materials of this invention and are hereinafter referred to as polyamine species (1), (2) or (3). It is to be noted that each of these starting materials has internal tertiary amino groups in the chain which carries end groups that may be either secondary amino groups or chlorine or its equivalent. Hence, they are polymeric tertiary amines, but species (1) and (2) have at least one terminal secondary amino group also. In the antistatic compounds used herein, at least one of the end groups in each of the species is converted to a tertiary amine radical. The preferred final products, however, have all the terminal amino radicals converted to tertiary amino groups.

The polyamines which are the starting materials for this invention suffer certain deficiencies by virtue of the nature of their end groups which, as just stated, may be either secondary amino groups or covalently linked chlorine (or its equivalent) or both. Secondary amino groups may cause yellowing of the material to which the finish is applied. Terminal chlorine radicals provide a means for quaternization of internal tertiary amino groups distributed along the chain of the condensates, with attendant cross-linking which may cause gelation on standing. The elimination of either one or both of these disadvantages represents a major practical need of the textile industry.

It has now been found that such greatly improved characteristics can be imparted to the previously described amino condensates by converting a portion or all of the end groups present therein to tertiary amine radicals. Either the terminal secondary amine groups of polyamine species (1) and (2) or the end covalently linked chlorine (or equivalent) radicals of intermediate species (2) and (3) may be converted to tertiary amine groups, or both may be so converted.

The products utilized herein correspond to the general formula Y—Z—[N(R)—Z]$_p$—Y', where R is an alkyl, alkenyl or hydroxyalkyl radical containing from one to twenty-two carbons, preferably methyl, ethyl or hydroxyethyl; Z is a divalent radical derived from the intermediate alkylating polyalkylene glycol diester, viz. polyethylene glycol dichloride, i.e.

—CH$_2$CH$_2$(OCH$_2$CH$_2$)$_m$OR$_2$O(CH$_2$CH$_2$O)$_n$CH$_2$CH$_2$— wherein R$_2$ is an organic divalent radical such, for example, as a glycol radical, a dibasic acid radical OCACO, wherein A is the intermediate divalent radical of the dibasic acid or a diurethane radical OCNHANHCO, wherein A is again an intermediate divalent radical of the diurethane, and $m$ and $n$ are average numbers between 3 and 40; $p$ is an integer having a value of at least 1; Y is a tertiary amino radical, —NR$_3$R$_4$, wherein R$_3$ and R$_4$ may be the same or different alkyl, hydroxyalkyl, aralkyl or alkaralkyl radicals containing from one to ten carbon atoms; and Y' is selected from the group consisting of (1) a tertiary amino group, —$NR_5R_6$, wherein $R_5$ and $R_6$ have the same definition as $R_3$ and $R_4$ but may be either the same or different radicals, or (2) a secondary amino group, HNR—, or (3) a halogen or the ester-forming residue of an inorganic acid or of an organically substituted sulfuric, phosphoric or sulfonic acid such as —Cl or other equivalent covalently linked radical originating with the initial intermediate polyalkylene glycol alkylating diester used in producing the intermediate polymeric amines, for example, Br—, I—, —$SO_3H$, —$SO_3CH_3$, —$SO_4H$, —$SO_4CH_3$, $CH_3 \cdot C_6H_4SO_3$— and the like.

In producing the polymeric amines utilized herein which contain terminal tertiary amino groups, there are used, as starting materials, any of the above described three species of polymeric amines.

According to one embodiment, terminal secondary amino groups present in species (1) and (2) are converted to tertiary amino end groups by any suitable reaction such, for example, as by alkylation with an alkyl halide, specifically methylation with methyl chloride, or by reaction with formaldehyde and formic acid in accordance with the conventional Sommelet and Ferrand method well known to those skilled in the art and described, for example, in the Journal of the American Chemical Society 55, 4571–4587 (1933). The terminal secondary amino groups of species (1) and (2) may also be converted into tertiary amino radicals by benzylation with benzyl chloride or a substitution product thereof such as methyl-benzyl chloride, ethyl-benzyl chloride, cuminyl chloride or chloromethyl mesitylene, for example. Normally, but not necessarily, it will be advantageous to carry out alkylation or benzylation with a halide in the presence of an acid acceptor such as sodium hydroxide or sodium carbonate. Any other suitable alkylating agent may be employed. Thus, for example, we may use dimethyl sulfate, diethyl sulfate, triethyl phosphite, triethyl phosphate, the corresponding butyl derivatives and the like. Examples I to III illustrate the conversion of terminal secondary amine groups to tertiary amine radicals.

A major advantage of these products is the marked reduction in discoloration of textile materials treated therewith in contrast to the color developed by treatment with products containing secondary amine terminal groups. This is of great commercial significance especially where whiteness or fidelity of pastel shades is imperative, most particularly in the treatment of textile yarns, filaments and fibers.

As previously pointed out, polyamine species (2) and (3) contain terminal chlorine radicals which are organically bound, or other similar end groups originating with the alkylating polyethylene glycol diester used in their preparation. These chlorine end groups or their equivalents may be converted into tertiary amine radicals by reaction with a secondary aliphatic amine containing from two to six carbon atoms such, for example, as dimethyl amine, diethyl amine, diethanol amine, diisopropyl amine, diisopropanol amine and the like. This reaction may be carried out in the presence or absence of acid acceptors such as sodium hydroxide or carbonate, with or without pressure depending upon the boiling point of the secondary amine employed, and with or without an excess of the theoretical amount of amine. The conversion of halide end groups to tertiary amine radicals is advantageous when it is anticipated that the ultimate conditions of use of the finished goods will be such as to facilitate hydrolysis with consequent deterioration. As previously noted, terminal covalent chlorine or analogous groups of polyamine species (2) or (3) are potentially capable of giving rise to gelation of these products on standing during storage by virtue of cross-linking through quaternization of tertiary amino groups present within the molecular chain. Conversion of these quaternizing end groups to tertiary amino radicals eliminates this problem and increases the storage stability of the antistatic finishes. Example IV will illustrate this conversion of terminal covalently linked chlorine atoms, or their equivalent, to tertiary amino groups.

The water-soluble polymeric amines containing terminal tertiary amino groups which are the object of this invention can be cured to yield exceptionally durable antistatic finishes on hydrophobic fibers, filaments, yarns, fabrics and the like by curing the treated goods at elevated temperatures with a polyepoxide cross-linking agent. The mechanism of the reaction between polytertiary amines of the kind herein described and polyepoxides is not understood at the present time, although various hypotheses can be advanced to explain it. Regardless of theory, the fact is that modified polymeric amines of this invention which contain terminal tertiary amine end groups may be cross-linked to form a durable antistatic finish by applying them to a hydrophobic fiber or fabric or other textile material, together with a suitable polyepoxide and curing after drying. The cross-linking reaction is normally carried out at temperatures between 100° C. and 150° C. in less than five minutes. In particular, it has been found useful to cross-link these polymeric amines with a product available under the trademark "Eponite 100," from the Shell Chemical Corporation, which is believed to be the reaction product of glycerine and epichlorohydrin. Curing can also be carried out with any water-solubilized or dispersed polyepoxide described in British Patent 780,288 dated July 31, 1957.

If preferred, cross-linking may also be effected by curing with ethylene-imino compounds containing a plurality of aziridinyl groups such, for example, as tris-aziridinyl phosphine oxide and the like, by the methods described in copending application Ser. No. 268,590 filed Mar. 28, 1963.

The polyaziridinyl compounds useful as the second component of such treating baths are organic compounds containing at least two aziridinyl groups and at least one hydrophilic group sufficient to confer water solubility or ease of emulsifiability in water on the molecule, such hydrophilic group or groups being non-reactive with the aziridinyl group. Among the hydrophilic groups suitable for this purpose are the carbamido and oxo as well as sulfide, sulfone and polyether groups. Examples of polyaziridinyl compounds useful in the carrying out of this invention are tris-1-aziridinyl phosphine oxide; tris-1-aziridinyl phosphine sulfide; tris-1-(2-methyl) aziridinyl phosphine oxide; tris-1-(2-methyl) aziridinyl phosphine sulfide; 1,6-bis-(N-ethylenecarbamido) hexane; 1,3-bis-(N-ethylenethiocarbamido) propane; 2,4-bis-(N-ethylenecarbamido) toluene; 4,4-bis-(N-ethylenecarbamido) diphenyl ether; N-[tris-(1-aziridinyl) phosphoranylidene] acetamide; bis-(2-aziridinylethoxyethyl) ether; bis-(2-aziridinylethyl) sulfide; bis-(2-aziridinylethyl) sulfone; tris-(aziridinylmethyl) amine; dipotassium 2,4-diaziridinyl pentanoate; and the compound of formula:

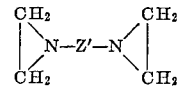

where Z' is the divalent radical of polyethylene glycol 400 derived by elimination of hydroxyl groups.

Other cross-linking agents which may be used to cure the products of this invention include polyethylene glycol dihalides and the like, in particular polyethylene glycol 600 diiodide, as well as the dichloride and dibromide which are somewhat slower in reaction than the diiodide. These agents may be selected from the group consisting of alkylene glycols, aralkylene glycols and polyethylene glycols in which the two terminal OH groups of the glycols are replaced by a member of the group consisting of chloride, bromide, iodide, sulfate, phosphate, methane sulfonate and toluene sulfonate groups.

The following examples wherein all percentages or parts are by weight, unless otherwise indicated, illustrate specific embodiments of our invention.

EXAMPLE I

One mol of the dichloride of polyethylene glycol 600 was reacted with 1.07 mols of methyl amine in ethylene glycol, the amount of glycol being equal in weight to that of the dichloride. Sodium carbonate was used as the acid acceptor and the reaction was carried out in the manner of Example 1 of U.S. Patent 3,070,552, the reaction being carried to 94.6% completion as measured by ionic chloride in the reaction product which was diluted to a 20% active material.

To 500 grams of this 20% solution was added 6.7 grams of 36° Bé. sodium hydroxide solution and 6.6 grams of benzyl chloride. The mixture was heated to 60–70° C. and held at that temperature for 4 hours with agitation. At the end of this time, all of the secondary amine groups originally present in the polymeric amine had been converted to tertiary amino groups. Instead of benzyl chloride, equivalent amounts of methyl benzyl chloride, ethyl benzyl chloride, cuminyl chloride or chloromethyl mesitylene may be used.

Thirty-six grams of water was removed from this solution by application of vacuum at 70° C. and the product was then applied to fabric and evaluated as follows.

An aqueous solution was prepared containing 29.6% of the above product, 1.48% of "Eponite 100" and 0.39% of "Neutronyx 600," a nonionic wetting agent supplied by Onyx Chemical Corporation and consisting of a nonylphenol polyglycol ether containing 9.5 mols of ethylene oxide. The solution was adjusted to a pH value of 3.5 with dilute hydrochloric acid, and 0.1% of zinc fluoborate was added in aqueous solution; it was then used to impregnate a piece of "Dacron" taffeta fabric ("Dacron" is the trade name of E. I. du Pont de Nemours & Company's polyester fiber) in a three-roll padder with the roll pressure adjusted so as to give a 27% increase in the weight of the fabric after impregnation. The fabric was framed, dried 2 minutes at 220° F. and then heated for 5 minutes at 250° F.

The fabric thus treated had an electrical resistivity of $7.4 \times 10^8$ ohms when measured by AATCC Method 76–1959 after conditioning at 30% Relative Humidity and 75° F. and had an electrical resistivity of $1.2 \times 10^{12}$ ohms after having been laundered 20 times in an automatic washing machine at 140° F. and with "Tide" detergent. An untreated sample of the same "Dacron" taffeta fabric had an electrical resistivity of greater than $1 \times 10^{13}$ ohms when measured under the same conditions. A fabric with an electrical resistivity less than $1 \times 10^{13}$ ohms as measured under the above stated conditions is accepted as having satisfactory antistatic properties by textile chemists and processors.

EXAMPLE II

To another 500 grams of the intermediate product of Example I prepared by reaction of polyethylene glycol 600 dichloride with methyl amine was added methyl chloride by slowly bubbling it into the 20% active reaction product held at 60–70° C. The reaction was continued with a fine stream of methyl chloride passing through the solution until the ionic chloride content increased from 0.323 milliequivalent per gram initially to 0.518 milliequivalent per gram and a test for secondary amine groups showed their absence. Vacuum was applied to remove excess dissolved methyl chloride and the product evaluated for antistatic properties in the following manner.

A piece of "Dacron" plain weave fabric was treated with an aqueous solution containing 29.6% of the above product, 1.48% "Eponite 100" and 0.39% "Neutronyx 600" just as described in Example I, but adjusted to a pH of 6.0 with hydrochloric acid, and with the addition of 0.1% of zinc fluoborate, the impregnated fabric being heated for 2 minutes at 220° F. and then 5 minutes at 300° F. When tested by the procedure described in Example I, this sample had an electrical resistivity of $5.7 \times 10^8$ ohms initially and $5.0 \times 10^{12}$ ohms after 10 launderings. "Dacron" twill weave treated in the same manner gave similar results.

EXAMPLE III

To 1000 grams of a 20% active solution of a polytertiary amine prepared by the method of Example I was added 6 grams of paraformaldehyde and the mixture was warmed with stirring to 80° C. and held there until all of the paraformaldehyde dissolved. At this point the solution was cooled to 30° C. and 23 grams of 100% formic acid was added slowly with agitation. Foaming occurred, but upon its cessation, after addition of all of the formic acid, the temperature was raised to 80° C. again and held there, with stirring for 2 hours. At the end of this time, the reaction mixture was cooled to room temperature and 45 grams of 36° Bé. sodium hydroxide solution was added to adjust the pH to 8.3. The product was evaluated for antistatic performance as follows.

The above product was applied to a piece of nylon tricot at a pH of 4.8 and with the addition of the fluoborate catalyst, by a procedure exactly the same as that described in Example I. The treated sample had an electrical resistivity of $3.3 \times 10^8$ ohms initially and $4.2 \times 10^{10}$ ohms after 20 launderings.

Under the conditions of the above examples, in each case the antistatic characteristics were not quite as durable as those obtained by applying the same type of formulations on the alkaline side, but there was a significant improvement in the whiteness of the treated and laundered fabrics.

In general, by methods similar to those of Example I to III above, any of the polymeric amines of Examples 1 through 10 of U.S. Patent 3,070,552 may be modified so as to contain tertiary amino end groups in accordance with the present invention instead of secondary amino terminal radicals as therein described.

EXAMPLE IV

Thirty-one lbs. of polyethylene glycol 600 dichloride having an average molecular weight of 628 was reacted with 1.64 lbs. of methyl amine in ethylene glycol according to the method of Example I, reaction being carried to 92.8% completion as measured by titration of ionic chloride in the reaction product. After reaction, cooling water was applied to the vessel and the pressure vented. The amount of unreacted covalently linked chlorine was calculated by subtracting the ionic chloride from the total chlorine originally present in the polyethylene glycol 600 dichloride and three times the theoretical amount (0.639 lb.) of dimethyl amine required to convert the calculated amount of residual organically bound chlorine was added to the autoclave. Heat was applied, the temperature being raised to 110–115° C. After 1½ hours at this temperature, the reaction mass was again sampled and titrated for ionic chloride, conversion being found to be complete. Heating was continued for an hour longer at which time chloride titration showed no further change. After settling and splitting of the aqueous bottom layer, fresh water was added to replace that removed in the bottom layer, a homogeneous 20% active solution of a polymeric amine being thus obtained in which all of the chlorine end groups were replaced by the dimethyl amino radical. The solution was stable to storage over prolonged periods at 50° C.

Application of this material to "Dacron" taffeta fabric in the manner described in Example I by conjoint treatment of the fabric with "Eponite 100" and curing after drying, yielded a fabric possessing antistatic properties comparable to those of the treated fabric of Example I.

The secondary amino end groups of the product of this example may be converted to tertiary amine radicals by any of the methods of Examples I to III. The products of Examples I to III derived from intermediate species (2) may also be reacted with excess dimethyl amine in a manner similar to that of Example IV, the residual terminal covalently linked chlorine being thus replaced by tertiary amino groups. The final product of reaction in either case is the same, both end groups being tertiary amino radicals as in the products of alkylation of intermediate species (1).

It will be understood from the foregoing description of this invention that the products thereof are applicable to hydrophobic textile materials in any form, whether fiber, filament, yarn, knitted or woven fabric, non-woven or felted fabric or the like.

Hydrophobic fibers are fibers which have a comparatively low capacity to retain moisture in comparison with such fibers as cotton and rayon. Such fibers are, for instance, nylon fibers (e.g. those called Nylon 66 which are prepared by condensation of 1,6-hexamethylene diamine and adipic acid; those called Nyon 6 which are prepared by polymerization of 6-amino caproic acid); "Orlon" acrylic fibers ("Orlon" is a trademark of the E. I. du Pont de Nemours & Company) prepared by polymerization of acrylonitrile; "Dacron" polyester fibers ("Dacron" is a trademark of the E. I. du Pont de Nemours & Company) prepared by condensation of terephthalic acid and ethylene glycol; cellulose triacetate fibers (marketed under the trademark "Arnel" by the Celanese Corporation of America); "Dynel" fibers ("Dynel" is a trademark of the Carbide & Carbon Chemical Company, a division of Union Carbide Corporation) which are copolymers of acrylonitrile and vinyl chloride; "Acrilan" fibers ("Acrilan" is a trademark of the Chemstrand Corporation) and similar synthetic fibers.

It will be understood, of course, that the products of this invention may also be employed in the antistatic treatment of blends of any of the aforementioned or other hydrophobic fibers and of blends thereof with natural fibers. The treatment of wool to impart antistatic properties thereto is also embraced within the scope of this invention.

The invention claimed is:

1. The process of treating hydrophobic textile materials which comprises: (a) impregnating a hydrophobic textile material with an aqueous solution of an antistatic agent comprising a water-soluble polytertiary amine while maintaining the pH of the antistatic agent on the acid side, said antistatic agent having at least one terminal tertiary amino radical and having the structure:

$$Y\!-\!Z\!-\![N(R)\!-\!Z]_p\!-\!Y'$$

wherein Y represents a tertiary amino radical $-NR_3R_4$ wherein $R_3$ and $R_4$ are each selected from the group consisting of alkyl, hydroxyalkyl, aralkyl and alkaralkyl radicals having 1 to 10 carbon atoms; Z is an organic divalent radical derived from a polyglycol; R is a radical selected from the group consisting of alkyl, alkenyl and hydroxyalkyl radicals having 1 to 22 carbon atoms; and $Y'$ is selected from the group consisting of (1) a tertiary amino group $-NR_5R_6$ wherein $R_5$ and $R_6$ are each selected from the group consisting of alkyl, hydroxyalkyl, aralkyl and alkaralkyl radicals having 1 to 10 carbon atoms, (2) a secondary amino group HNR— wherein R is the same as previously defined, and (3) a covalently linked radical of the group consisting of a halogen, the ester forming residue of an inorganic acid, and organically substituted sulfuric, sulfonic and phosphoric acids; and $p$ is an integer having a value of at least 1, and then drying and curing the composition in situ.

2. The process of claim 1 wherein said antistatic agent is mixed with a cross-linking agent.

3. The process of claim 2 wherein the cross-linking agent is a member of the group consisting of polyepoxide, polyaziridinyl and polyethylene glycol dihalide.

4. The process of claim 3 wherein the cross-linking agent is a polyepoxide and wherein an effective amount of zinc fluoborate is present as a catalyst.

References Cited

UNITED STATES PATENTS 3,021,232 2/1962 Pretka _____ 117—139.5 X
3,070,552 12/1962 Tesoro et al. _____ 260—2.1
3,258,358 6/1966 Cohen _____ 117—139.5

WILLIAM D. MARTIN, Primary Examiner

THEODORE G. DAVIS, Assistant Examiner

U.S. Cl. X.R.

117—138.8, 141, 145